(12) United States Patent
Milner

(10) Patent No.: US 10,287,885 B2
(45) Date of Patent: May 14, 2019

(54) ROTOR COMPONENT WITH SURFACES FOR CHECKING CONCENTRICITY

(71) Applicant: Siemens Aktiengesellschaft, Munich (DE)

(72) Inventor: Glynn Milner, Fiskerton (GB)

(73) Assignee: Siemens Aktiengesellschaft, Munich (DE)

( * ) Notice: Subject to any disclaimer, the term of this patent is extended or adjusted under 35 U.S.C. 154(b) by 429 days.

(21) Appl. No.: 15/117,906

(22) PCT Filed: Feb. 23, 2015

(86) PCT No.: PCT/EP2015/053709
§ 371 (c)(1),
(2) Date: Aug. 10, 2016

(87) PCT Pub. No.: WO2015/132091
PCT Pub. Date: Sep. 11, 2015

(65) Prior Publication Data
US 2016/0362981 A1    Dec. 15, 2016

(30) Foreign Application Priority Data
Mar. 3, 2014  (EP) .................................... 14157454

(51) Int. Cl.
*F01D 5/02*    (2006.01)
*F01D 21/00*   (2006.01)
(Continued)

(52) U.S. Cl.
CPC ........... *F01D 5/027* (2013.01); *F01D 21/003* (2013.01); *F01D 25/005* (2013.01);
(Continued)

(58) Field of Classification Search
CPC ...... F01D 5/027; F01D 21/003; F01D 25/005; F01D 25/285; F04D 27/001;
(Continued)

(56) References Cited

U.S. PATENT DOCUMENTS 3,996,668 A     12/1976  Sharon
4,526,747 A *   7/1985   Schimmel ............. B22F 3/1233
                                                29/889
(Continued)

FOREIGN PATENT DOCUMENTS

CN        101772691 B    11/2012
DE    102004037608 A1     3/2006
(Continued)

OTHER PUBLICATIONS

CN Office Action dated Apr. 5, 2017, for CN patent application No. 201580011768.1.
(Continued)

*Primary Examiner* — Jason D Shanske
*Assistant Examiner* — Brian Christopher Delrue
(74) *Attorney, Agent, or Firm* — Beusse Wolter Sanks & Maire

(57) ABSTRACT

A rotor component for a rotor assembly of a fluid energy machine, particularly of a gas turbine, a steam turbine, a compressor or the like, wherein the rotor component is at least partly made of a material susceptible to corrosion and/or oxidation and can be arranged concentrically to a rotation axis of the rotor assembly. The rotor component includes a circular surface for checking concentricity of the rotor component with respect to the rotation axis. The rotor component includes at least one additional circular surface for checking concentricity of the rotor component with
(Continued)

respect to the rotation axis, wherein the additional circular surface is coated with a corrosion and/or oxidation protection coating.

13 Claims, 1 Drawing Sheet

(51) Int. Cl.
| | |
|---|---|
| *F01D 25/28* | (2006.01) |
| *F01D 25/00* | (2006.01) |
| *F04D 27/00* | (2006.01) |
| *F04D 29/02* | (2006.01) |
| *F04D 29/26* | (2006.01) |
| *F04D 29/66* | (2006.01) |
| *G01B 5/252* | (2006.01) |

(52) U.S. Cl.
CPC ......... *F01D 25/285* (2013.01); *F04D 27/001* (2013.01); *F04D 29/023* (2013.01); *F04D 29/266* (2013.01); *F04D 29/662* (2013.01); *F05D 2220/31* (2013.01); *F05D 2220/32* (2013.01); *F05D 2230/80* (2013.01); *F05D 2230/90* (2013.01); *F05D 2260/15* (2013.01); *F05D 2260/83* (2013.01); *F05D 2260/95* (2013.01); *G01B 5/252* (2013.01)

(58) Field of Classification Search
CPC .... F04D 29/023; F04D 29/266; F04D 29/662; F05D 2220/31; F05D 2220/32; F05D 2220/80; F05D 2230/90; F05D 2260/15; F05D 2260/83; F05D 2260/95; G01B 5/252
USPC .................................. 416/61; 29/889; 73/66
See application file for complete search history.

(56) References Cited

U.S. PATENT DOCUMENTS

| | | | | |
|---|---|---|---|---|
| 5,794,338 | A * | 8/1998 | Bowden, Jr. ............ | B23P 6/007 29/402.09 |
| 6,354,780 | B1 | 3/2002 | Davis et al. | |
| 6,616,978 | B1 * | 9/2003 | Weimer .................. | C04B 28/34 427/376.1 |
| 7,140,952 | B1 * | 11/2006 | Juneau .................... | C23C 26/00 451/54 |
| 7,539,594 | B2 * | 5/2009 | Lee .......................... | F01D 5/027 702/147 |
| 2003/0056855 | A1 * | 3/2003 | Weimer .................... | C23C 8/02 148/276 |
| 2005/0064228 | A1 * | 3/2005 | Darolia .................. | C23C 28/321 428/680 |
| 2005/0142394 | A1 * | 6/2005 | Spitsberg ................ | C23C 14/08 428/701 |
| 2005/0198967 | A1 * | 9/2005 | Subramanian ............ | C23C 4/18 60/803 |
| 2005/0255329 | A1 * | 11/2005 | Hazel .................. | C23C 14/0617 428/472 |
| 2006/0260125 | A1 * | 11/2006 | Arnold ................. | B23K 10/027 29/889.1 |
| 2008/0041141 | A1 * | 2/2008 | Discenzo ................ | G01L 1/241 73/66 |
| 2010/0241393 | A1 | 9/2010 | Ihara et al. | |
| 2013/0058768 | A1 | 3/2013 | Tucker et al. | |
| 2013/0154194 | A1 * | 6/2013 | Van Saun ............. | F01D 11/005 277/316 |
| 2014/0017415 | A1 * | 1/2014 | Lin ........................ | C23C 26/00 427/580 |
| 2016/0003087 | A1 * | 1/2016 | Farris ..................... | F01D 11/24 415/170.1 |
| 2016/0032736 | A1 * | 2/2016 | Healy ..................... | F01D 5/288 428/138 |

FOREIGN PATENT DOCUMENTS

| | | |
|---|---|---|
| EP | 1188900 A2 | 3/2002 |
| EP | 2019185 A2 | 1/2009 |
| RU | 1786886 A1 | 12/1995 |
| RU | 1786886 C | 12/1995 |
| WO | 2011069219 A1 | 6/2011 |

OTHER PUBLICATIONS

Russian Federation office action dated Nov. 2, 2017, for RU patent application No. 2016135526.
EP Search Report, dated Oct. 10, 2014, fror EP application No. 14157454.1.
International Search Report, dated Jun. 11, 2015, for PCT application No. PCT/EP2015/053709.

\* cited by examiner

ROTOR COMPONENT WITH SURFACES FOR CHECKING CONCENTRICITY

CROSS REFERENCE TO RELATED APPLICATIONS

This application is the US National Stage of International Application No. PCT/EP2015/053709 filed Feb. 23, 2015, and claims the benefit thereof. The International Application claims the benefit of European Application No. EP EP14157454 filed Mar. 3, 2014. All of the applications are incorporated by reference herein in their entirety.

FIELD OF INVENTION

The invention relates to a rotor component for a rotor assembly of a fluid energy machine, particularly a gas turbine, a steam turbine, a compressor or the like, wherein the rotor component is at least partly made of a material susceptible to corrosion and/or oxidation and can be arranged concentrically to a rotation axis of the rotor assembly, wherein the rotor component comprises a circular surface for checking concentricity of the rotor component with respect to the rotation axis.

Further, the invention relates to a rotor assembly for a fluid energy machine, particularly a gas turbine, a steam turbine, a compressor or the like.

Furthermore, the invention relates to a fluid energy machine, particularly a gas turbine, a steam turbine, a compressor or the like.

Moreover, the invention relates to a method for manufacturing of a rotor component for a rotor assembly of a fluid energy machine, particularly a gas turbine, a steam turbine, a compressor or the like.

Additionally, the invention relates to a method for checking the concentricity of a rotor component with respect to a rotation axis of a rotor assembly of a fluid energy machine, particularly a gas turbine, a steam turbine, a compressor or the like.

BACKGROUND OF INVENTION

A fluid energy machine, such as a gas turbine, a steam turbine, a compressor or the like, comprises at least one rotor assembly and at least one stator assembly. For optimal operation of a rotor assembly it is necessary that rotor components of the rotor assembly are arranged concentrically with respect to a rotation axis of the rotor assembly.

Therefore, during initial building of a rotor assembly, the concentricity of the rotor components with respect to the rotation axis of the rotor assembly has to be checked.

For this purpose it is known to provide disc-shaped rotor components made from carbon steel having a circular surface on their radially outer contour. When checking concentricity of such a rotor disc with respect to a rotation axis of a rotor assembly the circular surface of the rotor disc can be brought into contact with a suitable measuring device, such as a dial indicator.

In use, components of the rotor assembly are exposed to working fluids. Through this, rotor components can suffer from a gradual destruction from a chemical reaction with its environment. If a circular surface of a rotor disc suffers from e. g. corrosion the circular surface gets rough in such a way that it cannot be used again, for example when a rotor assembly is serviced, for checking centricity of the rotor disc with respect to a rotation axis of a rotor assembly. Therefore, such a rotor disc becomes unserviceable and cannot be reused.

For checking concentricity of a rotor disc with respect to a rotation axis of a rotor assembly, a circular surface of a rotor disc made from carbon steel cannot viably be coated with a corrosion protection coating because an unavoidable variation of the coating thickness affects the concentricity measurement.

It is known to use rotor discs made from corrosion resistant material which can be reused after a period of service as the geometry of a circular surface of such a rotor disc is unchanged. But the corrosion resistant material is more expensive than carbon steel material.

EP2019185A2 discloses a method of balancing an assembly of rotary parts of a gas turbine engine comprising measuring at least one of the concentricity and parallelism of each component and considering globally all possible component stacking positions to generate an optimized stacking position for each component of the assembly to minimize assembly unbalance.

US2010/241393A1 discloses a system that calculates axial deformation of a turbine rotor.

EP1188900A2 discloses a blisk that includes a disk having a rim from which extends a row of blades. The rim includes axially opposite overhangs one of which includes an arcuate balance land disposed eccentrically to the centerline axis of the disk for balancing the blisk.

SUMMARY OF INVENTION

It is an object of the invention to provide a rotor component made at least partly from a material susceptible to corrosion and/or oxidation that allows checking its concentricity with respect to a rotation axis of a rotor assembly after at least one period of service and therefore can be reused at least one time.

This object is solved by a rotor component, a rotor assembly, a fluid energy machine, and a method according to the claims. Advantageous embodiments are disclosed be the dependent claims which can either by taken alone or by taken in any combination relate to an aspect of the invention.

An embodiment relates to a rotor component for a rotor assembly of a fluid energy machine, particularly a gas turbine, a steam turbine, a compressor or the like, wherein the rotor component is at least partly made of a material susceptible to corrosion and/or oxidation and can be arranged concentrically to a rotation axis of the rotor assembly, wherein the rotor component comprises a circular surface for checking concentricity of the rotor component with respect to the rotation axis, characterized in that the rotor component comprises at least one additional circular surface for checking concentricity of the rotor component with respect to the rotation axis, wherein the additional circular surface is coated with a corrosion and/or oxidation protection coating.

According to the invention, the rotor component comprises at least one additional circular surface which can be used for checking concentricity of the rotor component of a rotor assembly of a fluid energy machine after a first period of service. For this, the corrosion and/or oxidation protective coating is removed from the additional circular surface before checking said concentricity. The rotor component can also have two, three or more additional circular surfaces each coated with a corrosion and/or oxidation protection coating. This allows checking of the concentricity of such a rotor component with respect to a rotation axis of a rotor assembly after two, three or more periods of service accordingly.

The rotor component may entirely be made from a material susceptible to corrosion and/or oxidation. Regarding the invention, at least the circular surface and the at least one additional surface are made from a material susceptible to corrosion and/or oxidation.

The corrosion and/or oxidation coating may be made from any suitable material that can easily be removed from the additional circular surface without changing geometric characteristics of the additional circular surface.

Advantageously, the diameter of the additional circular surface differs from the diameter of the circular surface.

Advantageously, the diameter of the additional circular surface is less than the diameter of the circular surface.

Advantageously, the rotor component is a rotor disc for coupling a rotor platform of the rotor assembly to a rotor shaft of the rotor assembly. The rotor platform can carry rotor blades, for example turbine blades or compressor blades.

The material susceptible to corrosion and/or oxidation is in particular carbon steel, in particular low carbon steel.

Typically, a low carbon steel has a carbon content of 0.5% or less. As an alternative it is advantageous that the material susceptible to corrosion and/or oxidation is any predominantly ferrous material or ferrous alloy which has less than 11% Chrome content or aluminium.

A further embodiment relates to a rotor assembly for a fluid energy machine, particularly a gas turbine, a steam turbine, a compressor or the like, characterized by at least one rotor component according to one of the preceding embodiments or any combination of these embodiments. The advantages disclosed above with respect to the rotor component are correspondingly connected with this rotor assembly.

A further embodiment relates to a fluid energy machine, particularly a gas turbine, a steam turbine, a compressor or the like, characterized by at least one aforementioned rotor assembly. The advantages disclosed above with respect to the rotor component are correspondingly connected with this fluid energy machine.

A further embodiment relates to a method for manufacturing of a rotor component for a rotor assembly of a fluid energy machine, particularly a gas turbine, a steam turbine, a compressor or the like, comprising at least the steps of: —providing a blank body made at least partly of a material susceptible to corrosion and/or oxidation; —forming a circular surface for checking concentricity of the rotor component with respect a rotation axis of the rotor assembly;— forming at least one additional circular surface for checking concentricity of the rotor component with respect to the rotation axis; and —coating the additional circular surface with a corrosion and/or oxidation protection coating.

The advantages disclosed above with respect to the rotor component are also connected with this rotor assembly. The first three steps may be combined in one step. For example, a blank body having the circular surface and at least one additional circular surface may be casted or forged.

Advantageously, the additional circular surfaced is formed in such a way that the diameter of the additional circular surface differs from the diameter of the circular surface.

Advantageously, the additional circular surfaced is formed in such a way that the diameter of the additional circular surface is less than the diameter of the circular surface.

Advantageously, carbon steel is used as material susceptible to corrosion and/or oxidation.

A further embodiment relates to a method for checking the concentricity of a rotor component according to one of the above embodiments or any combination of these embodiments with respect to a rotation axis of a rotor assembly of a fluid energy machine, particularly a gas turbine, a steam turbine, a compressor or the like, after use of the rotor component, comprising at least the steps of: —removing the corrosion and/or oxidation protection coating from the additional circular surface; and —checking the concentricity of the rotor component with respect to the rotation axis.

Advantageously, the concentricity of the rotor component with respect to a rotation axis is checked using an indicator device, for example a dial indicator device.

BRIEF DESCRIPTION OF THE DRAWINGS

In the following, embodiments of the inventive rotor component are explained in connection with the attached schematic drawings, the drawings showing.

DETAILED DESCRIPTION OF INVENTION

Figure 1:
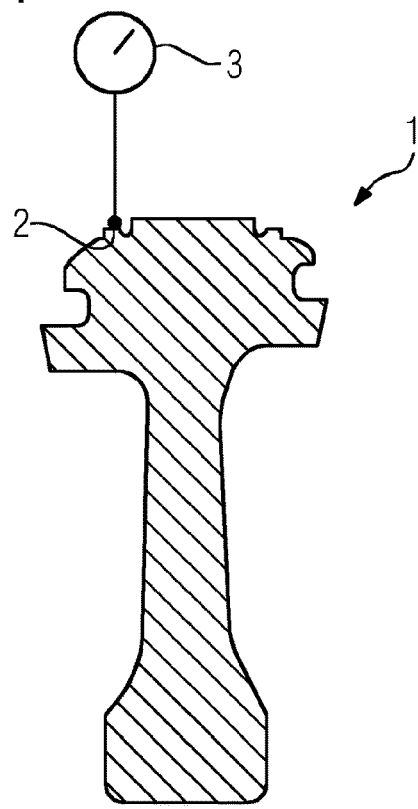
FIG. 1 is a cross-section of an embodiment of a conventional rotor component.

FIG. 1 shows a cross-section of an embodiment of a conventional rotor component 1 in form of a rotor disc for coupling a rotor platform of a rotor assembly (not shown) to a rotor shaft of the rotor assembly. The rotor component 1 is made from carbon steel and can be arranged concentrically to a rotation axis of the rotor assembly. The rotor component 1 comprises a circular surface 2 for checking concentricity of the rotor component 1 with respect to the rotation axis. The concentricity of the rotor component 1 with respect to the rotation axis is checked using a conventional dial indicator device 3.

Figure 2:
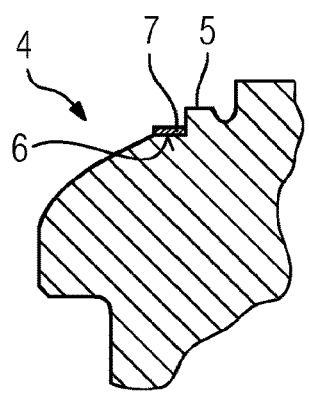
FIG. 2 is a detail of a cross-section of an embodiment of a new rotor component according to the invention.

FIG. 2 shows a detail of a cross-section of an embodiment of a new rotor component 4 according to the invention in form of a new rotor disc of a rotor assembly of a fluid energy machine (not shown). The rotor component 4 may be designed similar to the rotor component 1 shown in FIG. 1. The rotor component 4 is entirely made from carbon steel and can be arranged concentrically to a rotation axis of a rotor assembly of the fluid energy machine. The rotor component 4 comprises a circular surface 5 for checking concentricity of the rotor component 4 with respect to a rotation axis of the rotor assembly. Moreover, the rotor component 4 comprises an additional circular surface 6 for checking concentricity of the rotor component 4 with respect to the rotation axis, wherein the additional circular surface 6 is coated with a corrosion protection coating 7. The diameter of the additional circular surface 6 is less than the diameter of the circular surface 5.

The new rotor component 4 comprises at least its radially outer portion, with respect to the rotational axis, the material susceptible to corrosion and/or oxidation.

Therefore, the circular surface 5 and the at least one additional circular surface 6 comprise the material susceptible to corrosion and/or oxidation.

Figure 3:
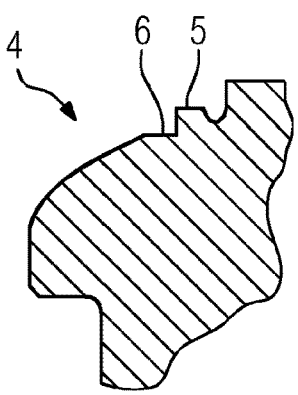
FIG. 3 is a detail of a cross-section of the rotor component shown in FIG. 2 before checking concentricity after a first period of service.

FIG. 3 shows a detail of a cross-section of the rotor component 4 shown in FIG. 2 before checking concentricity after a first period of service. The corrosion protection coating 7 has been removed from the additional circular surface 6. The circular surface 5 is corroded and therefore cannot be used for checking concentricity of the rotor component 4 with respect to the rotation axis of the rotor assembly. Instead, the concentricity of the rotor component 4 with respect to the rotation axis of the rotor assembly is checked using the uncoated additional circular surface 6. Thus, the rotor component 4 can be reused for a second period of service.

Although the invention has been explained and described in detail in connection with the preferred embodiments it is noted that the invention is not limited to the disclosed embodiments. A person skilled in the art can derive from these embodiments other variations without leaving the scope of protection of the invention.

The invention claimed is:

1. A rotor component for a rotor assembly of a fluid energy machine,
   wherein the rotor component is at least partly made of a material susceptible to corrosion and/or oxidation and is arranged concentrically to a rotation axis of the rotor assembly,
   wherein the rotor component comprises:
   a circular surface for checking concentricity of the rotor component with respect to the rotation axis, and
   at least one additional circular surface for checking concentricity of the rotor component with respect to the rotation axis,
   wherein the additional circular surface is coated with a corrosion and/or oxidation protection coating,
   wherein the circular surface and the at least one additional circular surface comprise the material susceptible to corrosion and/or oxidation.

2. The rotor component according to claim 1,
   wherein the diameter of the additional circular surface differs from the diameter of the circular surface.

3. The rotor component according to claim 2,
   wherein the diameter of the additional circular surface is less than the diameter of the circular surface.

4. The rotor component according to claim 1,
   wherein the rotor component is a rotor disc for coupling a rotor platform of the rotor assembly to a rotor shaft of the rotor assembly.

5. The rotor component according to claim 1,
   wherein the material susceptible to corrosion and/or oxidation is any one of a group comprising a carbon steel, a low carbon steel, a predominantly ferrous material or ferrous alloy which has less than 11% Chrome content, and aluminium.

6. A rotor assembly for a fluid energy machine comprising a gas turbine, a steam turbine, or a compressor, the rotor assembly comprising:
   at least one rotor component according to claim 1.

7. A fluid energy machine comprising a gas turbine, a steam turbine, or a compressor, the fluid energy machine comprising:
   at least one rotor assembly according to claim 6.

8. A method for manufacturing of a rotor component for a rotor assembly of a fluid energy machine comprising:
   providing a blank body made at least partly of a material susceptible to corrosion and/or oxidation;
   forming a circular surface for checking concentricity of the rotor component with respect a rotation axis of the rotor assembly, the circular surface comprises the material susceptible to corrosion and/or oxidation;
   forming at least one additional circular surface for checking concentricity of the rotor component with respect to the rotation axis, the at least one additional circular surface comprises the material susceptible to corrosion and/or oxidation; and
   coating the additional circular surface with a corrosion and/or oxidation protection coating.

9. The method according to claim 8,
   wherein the additional circular surfaced is formed such that the diameter of the additional circular surface differs from the diameter of the circular surface.

10. The method according to claim 9,
    wherein the additional circular surfaced is formed such that the diameter of the additional circular surface is less than the diameter of the circular surface.

11. The method according to claim 8,
    wherein carbon steel is used as material susceptible to corrosion and/or oxidation.

12. A method for checking the concentricity of a rotor component according to claim 1 with respect to a rotation axis of a rotor assembly of a fluid energy machine, after use of the rotor component, the method comprising:
    removing the corrosion and/or oxidation protection coating from the additional circular surface; and
    checking the concentricity of the rotor component with respect to the rotation axis.

13. The method according to claim 12,
    wherein the concentricity of the rotor component with respect to a rotation axis is checked using an indicator device.

* * * * *